US008858245B2

(12) United States Patent
Huang et al.

(10) Patent No.: US 8,858,245 B2
(45) Date of Patent: Oct. 14, 2014

(54) LEAKAGE PROTECTION SOCKET WITH INTEGRATED BAFFLE LOCKING MECHANISM

(71) Applicant: Huadao Huang, Yueqing (CN)

(72) Inventors: Huadao Huang, Yueqing (CN); Defu Huang, Wenzhou (CN)

(73) Assignee: Huadao Huang, Yueqing, Zhejiang Province (CN)

( * ) Notice: Subject to any disclaimer, the term of this patent is extended or adjusted under 35 U.S.C. 154(b) by 50 days.

(21) Appl. No.: 13/772,468

(22) Filed: Feb. 21, 2013

(65) Prior Publication Data

US 2013/0171847 A1 Jul. 4, 2013

Related U.S. Application Data

(63) Continuation-in-part of application No. 13/249,882, filed on Sep. 30, 2011, now Pat. No. 8,382,497, and a continuation-in-part of application No. 13/194,989, filed on Jul. 31, 2011, now Pat. No. 8,297,990, and a continuation-in-part of application No. 13/467,018, filed on May 8, 2012.

(30) Foreign Application Priority Data

| Sep. 30, 2010 | (CN) | 2010 1 0299583 |
| Dec. 9, 2010 | (CN) | 2010 1 0580104 |
| May 12, 2011 | (CN) | 2011 1 0122297 |

(51) Int. Cl.
H01R 13/44 (2006.01)
H01H 73/44 (2006.01)
H01R 13/713 (2006.01)
H01R 13/453 (2006.01)
H02H 3/16 (2006.01)
H01R 24/62 (2011.01)
H01R 25/00 (2006.01)

(52) U.S. Cl.
CPC .............. H01R 13/44 (2013.01); H01H 73/44 (2013.01); H01R 24/62 (2013.01); H01R 13/7135 (2013.01); H01R 13/4534 (2013.01); H02H 3/16 (2013.01); H01R 25/006 (2013.01)
USPC .......................................... 439/137; 439/145

(58) Field of Classification Search
USPC .................... 439/135–137, 140, 145
See application file for complete search history.

(56) References Cited

U.S. PATENT DOCUMENTS 6,580,344 B2 * 6/2003 Li ..................................... 335/18
6,963,260 B2 * 11/2005 Germain et al. ................. 335/18
(Continued)

FOREIGN PATENT DOCUMENTS

CN 2476889 Y 2/2002
CN 201490423 U 5/2010
(Continued)

Primary Examiner — Ross Gushi
(74) Attorney, Agent, or Firm — Mei & Mark LLP

(57) ABSTRACT

A power outlet may comprise an enclosure with at least one plug jack, a reset button comprising at least one integrally formed extension latch arm, the extension latch arm comprising at least one positioning pin, and at least one baffle configured to selectively block at least a portion of the plug jack, the baffle comprising an outer wall comprising a face, a pin slit, and a leg. The extension latch arm positioning pin is configured to selectively press against the outer wall face when the extension latch arm is in an upward position. The extension latch arm positioning pin is configured to selectively enter the outer wall pin slit when the extension latch arm is in a downward position.

27 Claims, 16 Drawing Sheets

(56) References Cited

U.S. PATENT DOCUMENTS

| | | | |
|---|---|---|---|
| 6,998,945 B2* | 2/2006 | Huang et al. | 335/18 |
| 7,019,952 B2* | 3/2006 | Huang et al. | 361/42 |
| 7,195,500 B2* | 3/2007 | Huang et al. | 439/107 |
| 7,265,956 B2* | 9/2007 | Huang | 361/42 |
| 7,289,306 B2* | 10/2007 | Huang et al. | 361/42 |
| 7,295,415 B2* | 11/2007 | Huang et al. | 361/107 |
| 7,315,227 B2* | 1/2008 | Huang et al. | 335/6 |
| 7,317,600 B2* | 1/2008 | Huang et al. | 361/42 |
| 7,411,766 B1* | 8/2008 | Huang et al. | 361/42 |
| 7,455,538 B2* | 11/2008 | Germain | 439/137 |
| 7,510,412 B1 | 3/2009 | Valentin | |
| 7,538,993 B2* | 5/2009 | Huang et al. | 361/42 |
| 7,576,959 B2* | 8/2009 | Huang et al. | 361/42 |
| 7,588,447 B1* | 9/2009 | Ni | 439/137 |
| 7,633,726 B2* | 12/2009 | Huang et al. | 361/42 |
| 7,645,148 B2* | 1/2010 | Carbone et al. | 439/137 |
| 7,645,149 B2* | 1/2010 | Carbone et al. | 439/137 |
| 7,833,030 B1* | 11/2010 | Huang | 439/137 |
| 7,859,368 B2* | 12/2010 | Huang et al. | 335/18 |
| 7,883,346 B2* | 2/2011 | Huang | 439/140 |
| 7,887,346 B1* | 2/2011 | Huang | 439/140 |
| 7,934,935 B1* | 5/2011 | Gao | 439/137 |
| 7,985,085 B2* | 7/2011 | Gao | 439/137 |
| 8,007,296 B2* | 8/2011 | Chen et al. | 439/136 |
| 8,147,260 B2* | 4/2012 | Huang | 439/140 |
| 8,193,445 B2* | 6/2012 | Li | 174/53 |
| 8,233,251 B2* | 7/2012 | Huang et al. | 361/42 |
| 8,297,990 B2* | 10/2012 | Huang | 439/140 |
| 8,300,368 B2* | 10/2012 | Huang et al. | 361/42 |
| 8,382,497 B2* | 2/2013 | Huang | 439/137 |
| 8,472,155 B2* | 6/2013 | Huang | 361/42 |
| 8,550,829 B2* | 10/2013 | Huang | 439/145 |
| 8,736,279 B2* | 5/2014 | Huang | 324/557 |
| 2004/0027740 A1* | 2/2004 | Huang et al. | 361/42 |
| 2006/0193092 A1* | 8/2006 | Huang et al. | 361/42 |
| 2006/0238933 A1* | 10/2006 | Huang et al. | 361/42 |
| 2006/0274463 A1* | 12/2006 | Huang et al. | 361/42 |
| 2006/0279886 A1* | 12/2006 | Huang et al. | 361/42 |
| 2007/0014068 A1* | 1/2007 | Huang et al. | 361/115 |
| 2007/0041134 A1* | 2/2007 | Huang et al. | 361/42 |
| 2007/0049077 A1* | 3/2007 | Germain | 439/135 |
| 2007/0076337 A1* | 4/2007 | Huang | 361/42 |
| 2007/0086127 A1* | 4/2007 | Huang | 361/42 |
| 2007/0211397 A1* | 9/2007 | Sokolow et al. | 361/42 |
| 2008/0094765 A1* | 4/2008 | Huang et al. | 361/42 |
| 2008/0170341 A1* | 7/2008 | Huang et al. | 361/42 |
| 2008/0192393 A1* | 8/2008 | Huang et al. | 361/45 |
| 2009/0086389 A1* | 4/2009 | Huang et al. | 361/42 |
| 2009/0086390 A1* | 4/2009 | Huang | 361/49 |
| 2009/0091869 A1* | 4/2009 | Huang et al. | 361/42 |
| 2009/0161271 A1* | 6/2009 | Huang et al. | 361/42 |
| 2009/0227130 A1* | 9/2009 | Carbone et al. | 439/137 |
| 2009/0236115 A1* | 9/2009 | Li | 174/53 |
| 2010/0073178 A1* | 3/2010 | Huang et al. | 340/664 |
| 2010/0159722 A1* | 6/2010 | Chen | 439/137 |
| 2010/0317207 A1* | 12/2010 | Huang | 439/137 |
| 2010/0317209 A1* | 12/2010 | Huang | 439/140 |
| 2011/0092085 A1* | 4/2011 | Gao | 439/137 |
| 2011/0092086 A1* | 4/2011 | Gao | 439/137 |
| 2011/0104918 A1* | 5/2011 | Chen et al. | 439/136 |
| 2011/0211283 A1* | 9/2011 | Huang et al. | 361/42 |
| 2011/0273803 A1* | 11/2011 | Huang | 361/42 |
| 2011/0273813 A1* | 11/2011 | Huang | 361/170 |
| 2012/0081819 A1* | 4/2012 | Huang | 361/42 |
| 2012/0083142 A1* | 4/2012 | Huang | 439/135 |
| 2012/0149221 A1* | 6/2012 | Huang | 439/137 |
| 2012/0170159 A1* | 7/2012 | Huang | 361/42 |
| 2012/0187958 A1* | 7/2012 | Huang | 324/557 |
| 2012/0287537 A1* | 11/2012 | Huang | 361/42 |
| 2012/0287572 A1* | 11/2012 | Huang | 361/679.58 |
| 2012/0320485 A1* | 12/2012 | Huang | 361/114 |
| 2013/0171847 A1* | 7/2013 | Huang et al. | 439/137 |

FOREIGN PATENT DOCUMENTS

| | | |
|---|---|---|
| CN | 201536176 U | 7/2010 |
| CN | 102270788 A | 12/2011 |

* cited by examiner

LEAKAGE PROTECTION SOCKET WITH INTEGRATED BAFFLE LOCKING MECHANISM

PRIORITY

This application is a continuation-in-part (CIP) of pending U.S. application Ser. No. 13/249,882, "Power Outlet with Shield Locking Mechanism," filed Sep. 30, 2011, incorporated by reference herein in its entirety. This application claims the benefit of priority of Chinese patent application numbers 201010580104.6 filed Dec. 9, 2010 and 201010299583.4 filed Sep. 30, 2010, both of which are incorporated by reference in their entirety. This application also claims priority to and is a continuation-in-part (CIP) of U.S. patent application Ser. No. 13/194,989 entitled Leakage Protection Outlet, filed Jul. 31, 2011, now U.S. Pat. No. 8,297,990, the content of which is incorporated herein by reference in its entirety. This application is a continuation-in-part (CIP) of pending U.S. application Ser. No. 13/467,018, "Power Outlet with Jack Safety Shield Device," filed May 8, 2012, published as US Patent Application Publication 2012/0287572 A1 on Nov. 15, 2012, which claims priority to Chinese application number 201110122297.5 filed May 12, 2011, incorporated by reference herein in their entirety.

TECHNICAL FIELD

The present disclosure relates to a leakage protection socket, and particularly to a leakage protection socket with an integrated baffle locking mechanism.

BACKGROUND

There are two types of leakage protection sockets in the prior art. In one of them, both left and right jacks are I-shaped. In the other type, the left jack is I-shaped and the right is T-shaped. A power socket with a jack baffle device generally comprises a housing, a reset button with an extension arm, and a safety baffle device. A safety baffle device for the dual I-shaped jacks, such as that disclosed in the Utility Model Patent Publication of Patent No. 200920223089.2 corresponding to CN201536176U, comprises a left baffle, a right baffle, a spring, and a base securely connected with a middle bracket. A safety baffle device for the socket with an I-shaped left jack and a T-shaped right jack, such as that disclosed in the Utility Model Patent Publication of Patent No. 200920167808.3 corresponding to CN201490423U, comprises a left baffle, a right baffle, a first spring for resetting the left and right baffles, a small baffle for closing the T-shaped aperture, a second spring and reset mechanism for resetting the small baffle, and a base securely connected with a middle bracket. Upon insertion of a plug into the baffles, the left and right baffles will separate so as to expose the underlying conductive jackets. Upon pulling out the plug, the baffle unit will close the conductive jackets under the action of the reset spring. The safety baffle device requires an engaging lock mechanism to achieve the prevention of any unwanted insertion.

A baffle locking mechanism is disclosed in Chinese application No. 201110122297.5 corresponding to CN102270788A, which comprises a baffle latch linked with the reset button and a spring element for driving the up-and-down movement of the baffle latch. The structure of the baffle locking mechanism is complicated, requiring high precision of assembly; and the baffle latch tends to shake in the vertical plane, causing incorrect operations.

SUMMARY

In view of the above technical problems present in the prior art, the present disclosure provides a leakage protection socket with an integrated baffle locking mechanism, whose structure is simplified and whose operation is more reliable.

In one embodiment, a power outlet may comprise an enclosure with at least one plug jack, a reset button comprising at least one integrally formed extension latch arm, the extension latch arm comprising at least one positioning pin, and at least one baffle configured to selectively block at least a portion of the plug jack, the baffle comprising an outer wall comprising a face, a pin slit, and a leg. The extension latch arm positioning pin is configured to selectively press against the outer wall face when the extension latch arm is in an upward position. The extension latch arm positioning pin is configured to selectively enter the outer wall pin slit when the extension latch arm is in a downward position.

In another embodiment, a leakage protection outlet may comprise an upper cover comprising at least one pair of jacks, a middle bracket, a power input end, a power output end, at least one pair of conductive plug jackets, a first baffle with an outer face and a positioning slit beneath the outer face, a second baffle stacked on the first baffle, a baffle resetting mechanism between the first baffle and the second baffle, a reset button comprising at least one integrally formed extension latch arm, a reset mechanism, and an electromagnetic tripping mechanism. The reset button is linked to the reset mechanism. The reset mechanism is configured to connect the power input end to the power output end when the reset button is pressed. The electromagnetic tripping mechanism is configured to disconnect the power input end from the power output end when a leakage current occurs. The at least one pair of conductive plug jackets correspond to the at least one pair of jacks of the upper cover. The first baffle and the second baffle are positioned between the at least one pair of conductive plug jackets and the at least one pair of jacks. The extension latch arm is movable with the reset button from a first position abutting the outer face of the first baffle to a second position abutting the positioning slit.

A reset button for an outlet device may comprise a pressable middle section, a post extending away from the pressable middle section, the post have a latching area, at least one extension latch arm integral with the pressable area, and at least one positioning pin integral with the extension latch arm, the positioning pin extending perpendicular to the extension latch arm.

In another embodiment, a leakage protection socket with an integrated baffle locking mechanism may comprise a housing with two sets of guiding jacks and two sets of power jackets. A reset button may comprise a post with a locking area and a reset spring surrounding a portion of the post, the reset button being integrally formed with at least one baffle latch, each at least one baffle latch comprising a first positioning pin and a second positioning pin. A lock mechanism may be configured to lock the rest button locking area when the reset button moves from a first position to a second position. An electromagnetic trip mechanism may be configured to unlock the reset button locking area when a leaking current triggers the electromagnetic trip mechanism. Two sets of safety baffle devices may be between the guiding jacks and the power jackets, each set of safety baffle devices including a reset mechanism, a first baffle, and a second baffle configured to move between a first position that prevents access from the guiding jacks to the power jackets and a second position that exposes the power jackets for access from the guiding jacks. At least each of the first baffles comprise an outer face and a positioning slit below the outer face. When the reset button moves from the first position to the second position, the positioning pins move from positions against the outer faces to positions in the positioning slits and the safety baffle devices are unlocked for motion. When the reset button locking area is unlocked, the reset spring moves the positioning pins from the positioning slits to the positions against the outer faces and the safety baffle devices are locked from motion.

DETAILED DESCRIPTION

The present disclosure will be further described below in detail with references to the accompanying drawings and embodiments. Wherever possible, the same reference numbers will be used throughout the drawings to refer to the same or like parts. Directional references such as "left" and "right" are for ease of reference to the figures and for relative orientation; the directional references are not meant to be limiting.

Embodiment I

Figure 1:
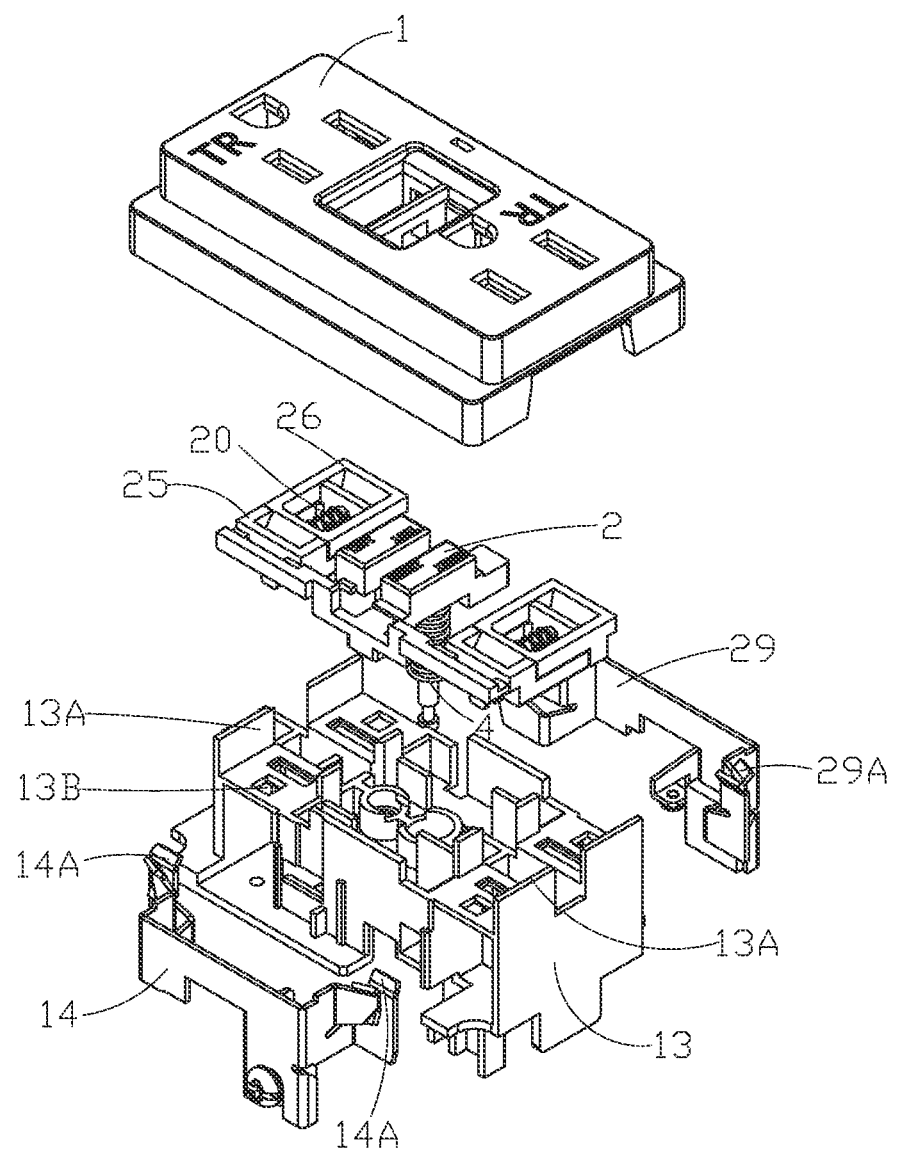
FIG. 1 is an exploded perspective structural view of embodiment I.
Figure 2:
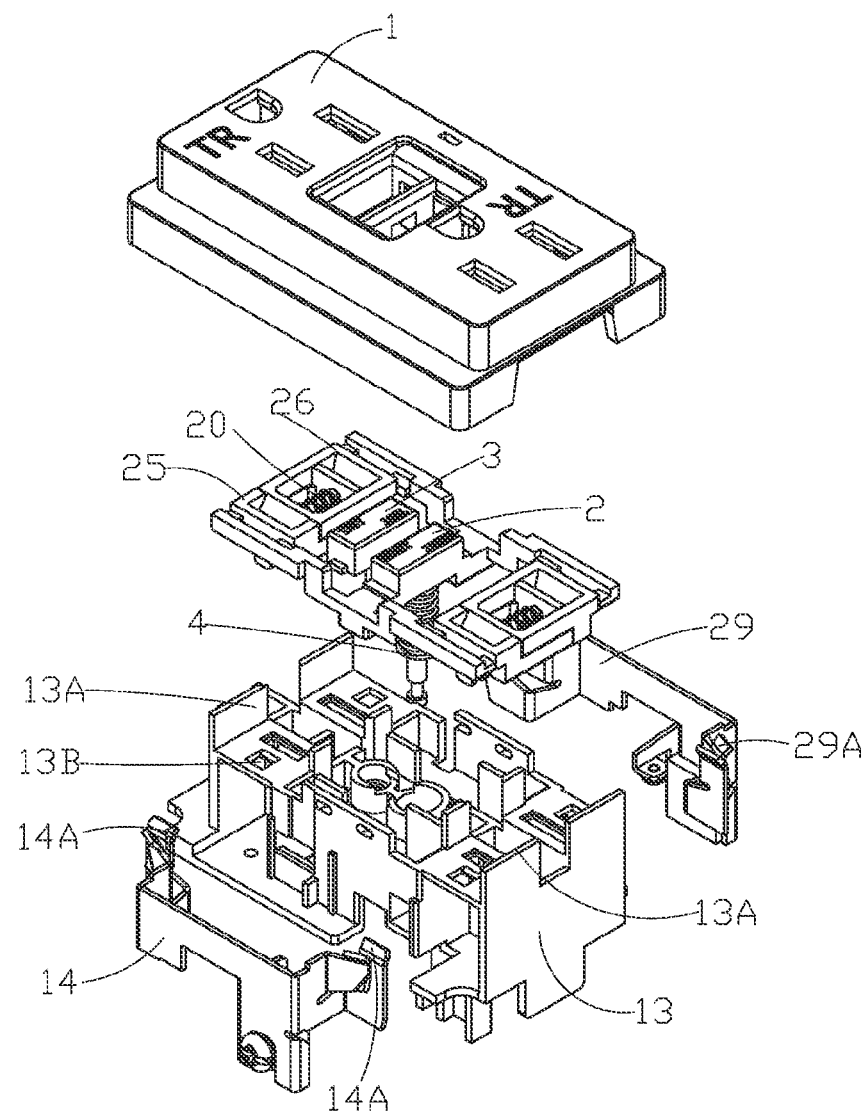
FIG. 2 is an exploded perspective structural view of embodiment II.

Referring to FIGS. 1, 3, and 5-9, the embodiment is directed to a power socket with both jacks being I-shaped apertures, the embodiment has a leakage protection socket with a baffle locking mechanism. The power socket comprises a housing (the housing comprises an upper cover and a base, only the upper cover 1 is shown in FIG. 1), a reset button 2, a reset spring 4, a test button 3, and two sets of safety baffle devices. On the conductive metal piece 14 there is provided an I-shaped conductive jacket 14A. On the conductive metal piece 29 there is provided a I-shaped conductive jacket 29A. On the middle bracket 13 are provided guiding jacks at the locations corresponding to the I-shaped conductive jackets 14A and 29A. Once the guiding aperture is exposed, the conductive jacket will be exposed. The conductive jackets line up with the jack apertures on the upper cover and the safety baffle devices are between the jacks and the jackets.

Each safety baffle device comprises a retractable left baffle 25 and a retractable right baffle 26, which may prevent any insertion into the guiding jacks, and a reset mechanism (a spring 20 in this embodiment) for permitting automatic retracting of the left and right baffles after improper external force vanishes. The structure and operation of the baffles may be further understood from U.S. patent application Ser. No. 13/467,018, filed May 8, 2012, published as US 2012/0287572 on Nov. 15, 2012, corresponding to Chinese application 201110122297.5, incorporated herein by reference in their entirety.

The reset button 2 is integrally formed with at least one baffle latch corresponding to the baffles on the same side of the two sets of the safety baffle devices. One of the baffle latches and the outer sidewall of the corresponding baffle may have a positioning pin, and the other of the baffle latch and the corresponding baffle may have a lock position and an unlock position to engage with a positioning pin. A step running in the opening direction of the baffle is provided between the lock and unlock positions.

Within the housing are provided a lock mechanism, which hooks and locks the reset button 2 when the reset button 2 is pushed down and successfully reset, and an electromagnetic trip mechanism, which disengages the lock mechanism from a reset button guiding post when there is leaking current. As discussed in U.S. Pat. No. 8,297,990, incorporated herein by reference, the reset button may be linked to a reset mechanism, which may comprise the lock mechanism, that is configured to connect a power input end to a power output end. The electromagnetic trip mechanism may be configured to disconnect the power input end from the power output end when a leakage occurs. The reset button 2 is provided with a reset spring 4 around the reset button guiding post, which lifts the reset button upon being disengaged from the lock mechanism. When the reset button is not reset, the baffle latch is in engagement with the baffles through the positioning pin and the corresponding lock position, which locks the baffles; when the reset button is reset, the baffle latch follows the reset button 2 to travel down until the positioning pin is aligned to the unlock position, which allows the baffles to open. The unlock position is the positioning pin in the unlock slit on the corresponding baffle or the baffle latch, and the lock position is the positioning pin against the lock face above the unlock slit.

Figure 3:
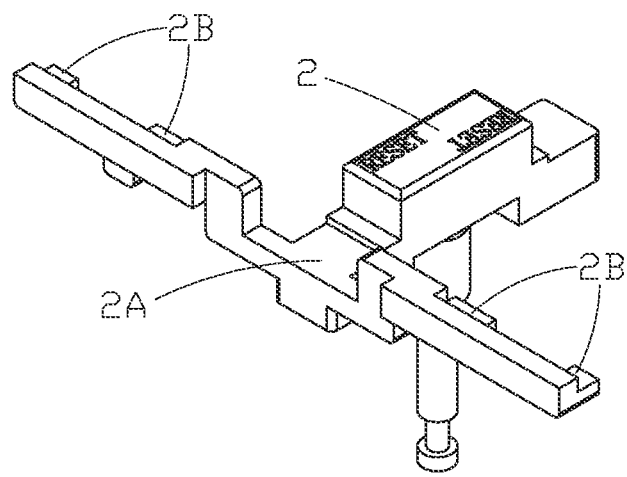
FIG. 3 is a structural view of a reset button with a single-side baffle latch of embodiment I.
Figure 5:
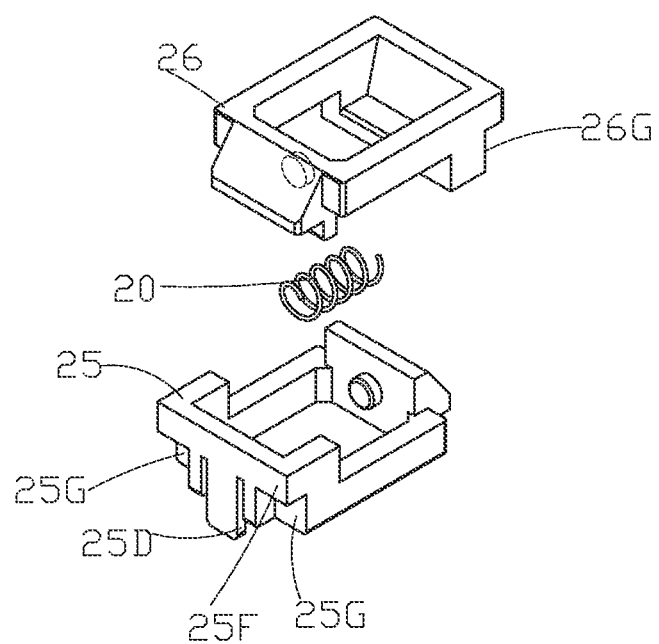
FIG. 5 is a structural view of the safety baffle device in embodiments I and II.

Specifically for the embodiment, referring to FIGS. 1, 3 and 5, the baffle latch has a positioning pin 2B facing the outer sidewall of the baffles on the same side of the two sets of the safety baffle devices, and the baffles on the same side (i.e., the left baffles 25) are correspondingly provided with a lock position face 25F for engaging with the positioning pin 2B of the baffle latch and an unlock slit 25G serving as the unlock position. Because the mis-insertion of items into the jacks is prevented as long as the opening of one baffle is restrained, the embodiment is only provided with a baffle latch on one side. Certainly, the lock and unlock positions can be provided via additional baffle latches, and the positioning pin faces and openings can be provided on additional corresponding baffles.

Figure 21:
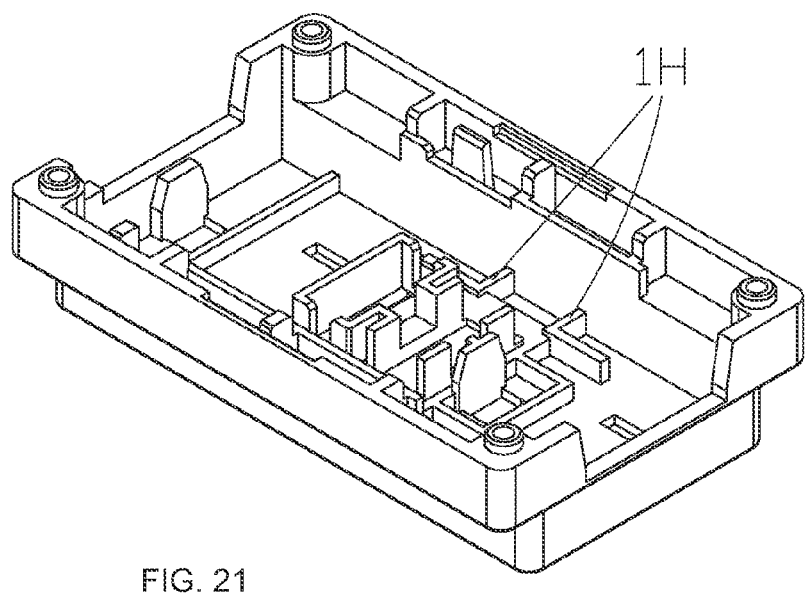
FIG. 21 is a view of the underside of the upper cover.

The housing includes an upper cover 1 and a base; the upper cover 1 has a mounting aperture to expose the reset button. In order to further improve the stability of the up-and-down movement of the reset button and the baffle latch, a guiding slit 2A with an opening facing upward is provided in the middle of the baffle latch. As shown in FIG. 21, the upper cover 1 has a guiding step 1H which extends into the guiding slit of the baffle latch and is kept in contact with the inner wall of the guiding slit during the up-and-down movement of the baffle latch with the reset button.

The baffle latch has two pairs of positioning pins 2B. Two unlock slits 25G are provided on each of the baffles on the same side corresponding to the baffle latch; they are respectively located on the corner of the outer side wall of the baffle. The unlock slit 25G is a rectangular notch with three open sides. Above the rectangular notch is the lock position face 25F capable of engaging and positioning with the positioning pin of the baffle latch.

The left baffle 25 and the right baffle 26 of the safety baffle device are slidably engaged in a crossing way so that sliding face 26C meets sliding face 25C. Within the housing is provided a middle bracket 13 with guiding jacks, the middle bracket 13 is provided with a slide platform for the left and right baffles to slide thereon. Under the action of the reset mechanism, the left and right baffles collaborate with each other to close the guiding jacks when they are in the retracted state. An optional guiding wall 13A assists with preventing the left and right baffles from sliding away from their intended positions on the slide platform.

In the embodiment, the reset mechanism of the baffle is a spring 20, and the left and right baffles are each provided with baffle legs (only the left baffle leg 25D shown in the figures). The slide platform of the middle bracket 13 is provided with positioning apertures 13B for insertion of the baffle legs. Both baffle legs come into contact engagement with the facing inner side edges of the two positioning apertures of the middle bracket when the left and right baffles are locked; and the guiding jacks of the middle bracket are exposed when the left and right baffles are opened.

The reset mechanism of the baffles may also be provided as follows: the reset mechanism of the baffles are elastic legs 25D, 26D respectively provided on the left and right baffles; within the housing is provided the middle bracket 13 with the guiding apertures, the slide platform of the middle bracket is provided with the positioning apertures 13B for insertion of the elastic legs, both baffle legs come into contact engagement respectively with the inner side edges of the two positioning apertures of the middle bracket when the left and right baffles are locked, and the elastic legs store the elastic potential energy of the relative movement and may expose the guiding jacks on the middle bracket when the baffles are unlocked. The elastic legs 25D and 26D on the left and right baffles are located on the outer side walls of respective baffles. There is provided a groove for providing curved space for the elastic legs at the junction of the elastic leg and the bottom of the baffle. A set of the baffle devices are provided with at least one spring 20, and the left and right baffles encompass the baffle spring between them, preferably on posts such as post 26B.

Figure 6:
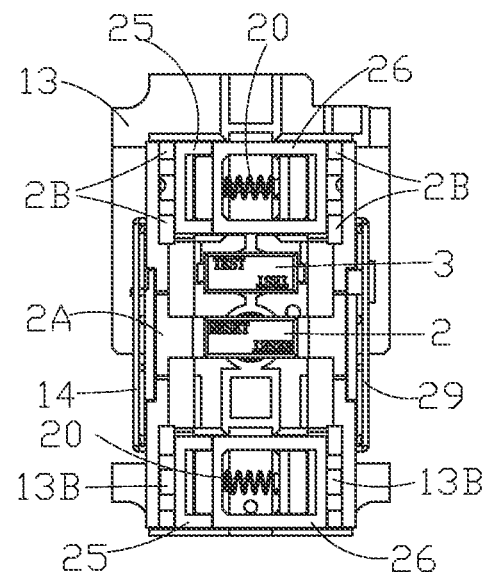
FIG. 6 is a top view of embodiment I in a locked state of the baffles (with the upper cover removed).
Figure 7:
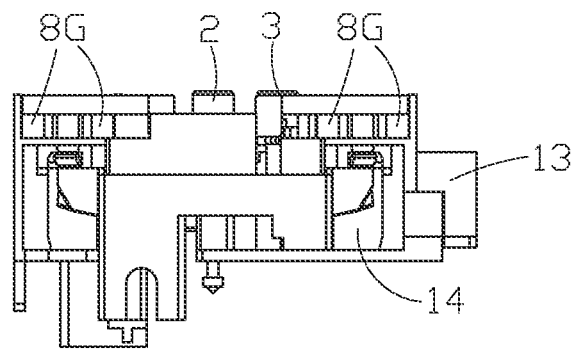
FIG. 7 is a structural side view of embodiment I in a locked state of the baffles (with the upper cover removed).
Figure 8:
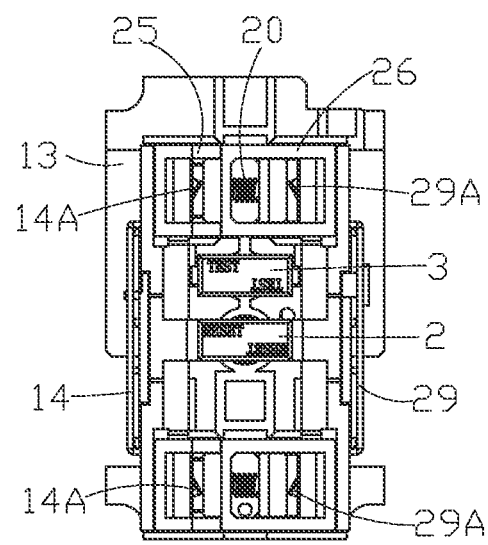
FIG. 8 is a structural top view of embodiment I in an unlocked state of the baffles (with the upper cover removed).
Figure 9:
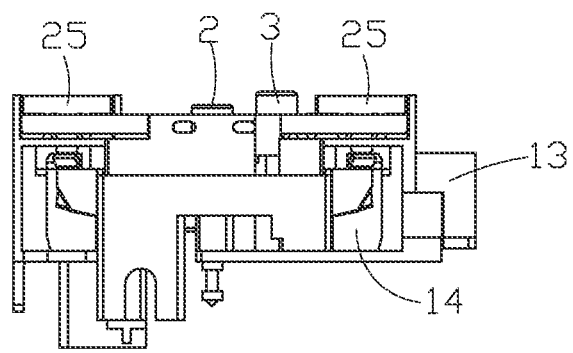
FIG. 9 is a structural side view of embodiment I in an unlocked state of the baffles (with the upper cover removed).
Figure 10:
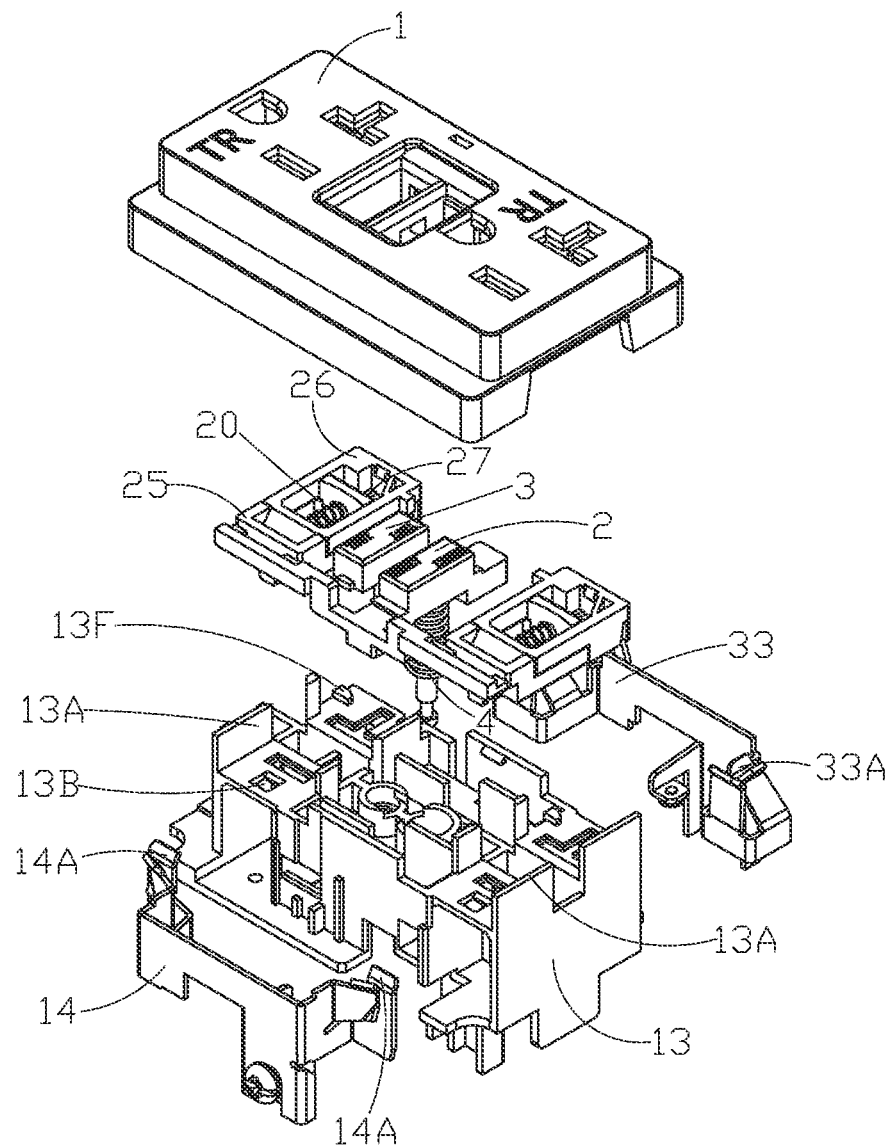
FIG. 10 is an exploded perspective structural view of embodiment III.
Figure 11:
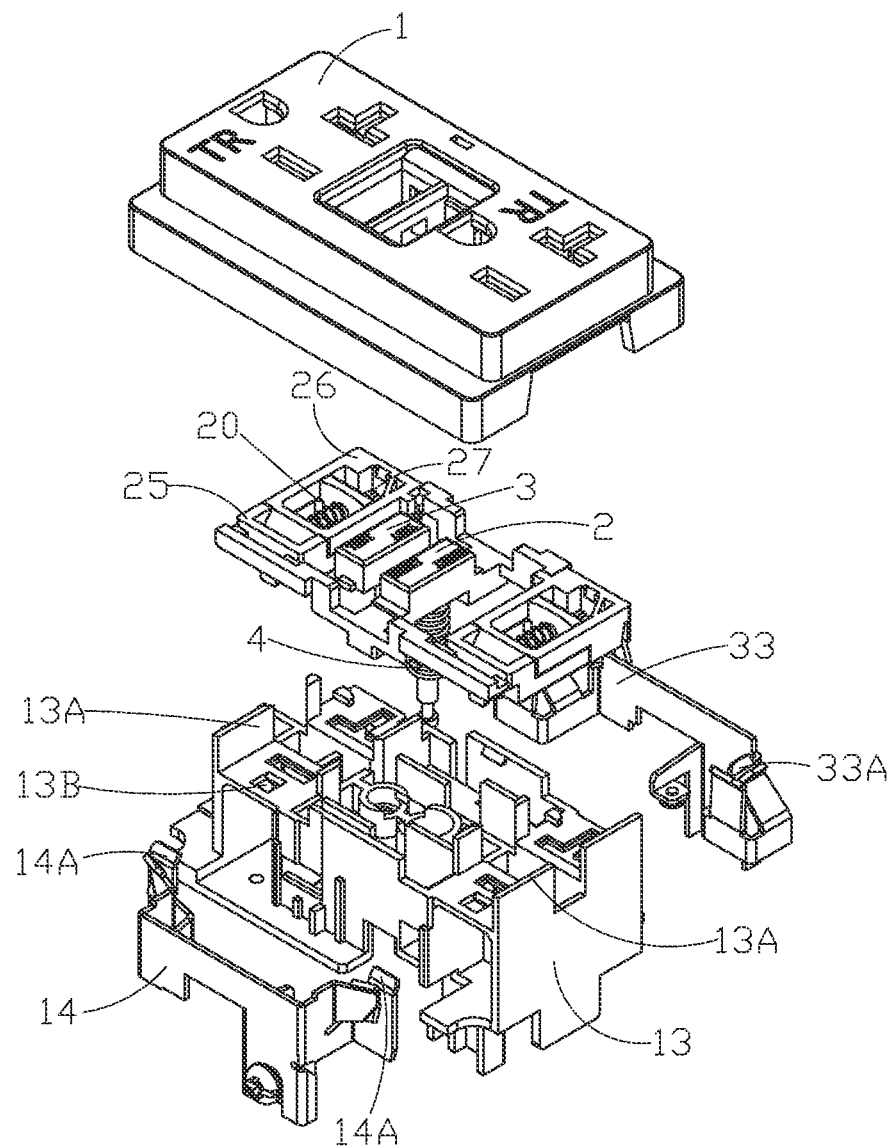
FIG. 11 is an exploded perspective structural view of embodiment IV.
Figure 12:
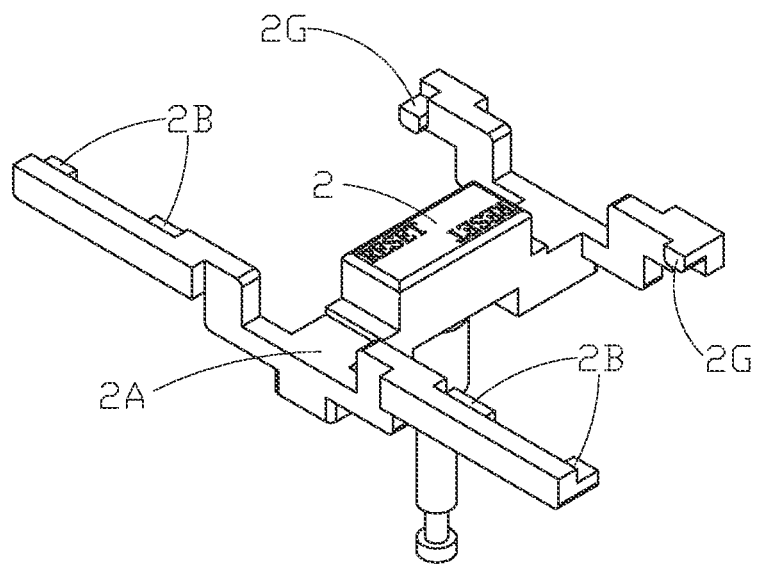
FIG. 12 is a structural view of a reset button with dual-side baffle latches of embodiment IV.
Figure 13:
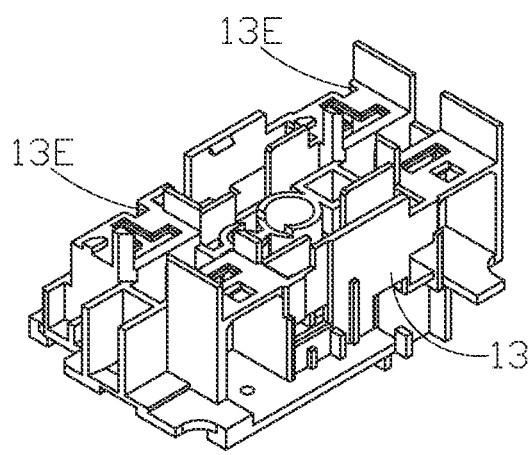
FIG. 13 is a structural view of a middle bracket of embodiment IV.
Figure 14:
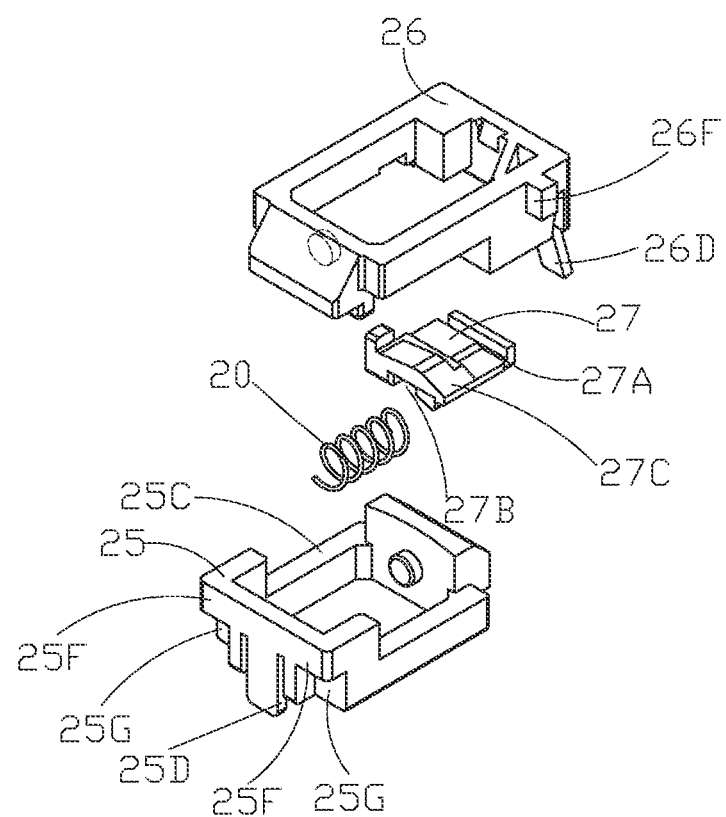
FIG. 14 is a structural view of a safety baffle device in embodiments III and IV.
Figure 15:
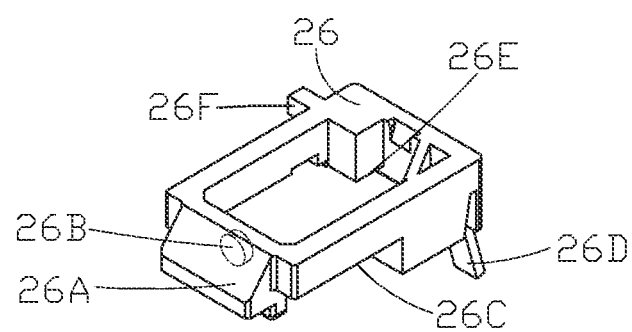
FIG. 15 is a structural view of a right baffle in embodiments III and IV.

The operation process is as follows: in the initial state, the reset button 2 is not pressed down, the positioning pin 2B on the baffle latch abuts against the lock position 25F of the left baffle, and the left baffle 25 is locked, as shown in FIGS. 6 and 7; when the reset button is pressed down and turned into the reset state, the reset button 2 brings the baffle latch to move downward, the positioning pin 2B on the baffle latch is located on a location corresponding to the unlock slit 25G on the outer side wall of the left baffle, allowing the left baffle 25 to be opened, at this time, upon insertion of the power plug, the left and right baffles are opened, as shown in FIGS. 8 and 9.

Embodiment II

Referring to FIGS. 2, 4 and 5-9, the embodiment is different from the embodiment I in that: in order to ensure the balance and operation stability of the reset button, the reset button in the embodiment is provided with two baffle latches, one of which engages with the left baffles 25 on the same side of the two sets of the safety baffle devices, and the other engages with the right baffles 26 on the same side of the two sets of the safety baffle devices. The operation process is similar to that of the embodiment I.

Embodiment III

Referring to FIGS. 10 and 13-20, the embodiment relates to the power socket with an I-shaped left jack and a T-shaped right jack. Within the housing is provided a middle bracket 13 and conductive metal pieces 14 and 33. On the conductive metal piece 14 there is provided an I-shaped conductive jacket 14A. On the conductive metal piece 33 there is provided a T-shaped conductive jacket 33A. On the middle bracket 13 are provided guiding jacks at the locations corresponding to the I-shaped 14A and T-shaped 33A conductive jackets. Once the guiding aperture is exposed, the conductive jacket will be exposed.

Figure 22:
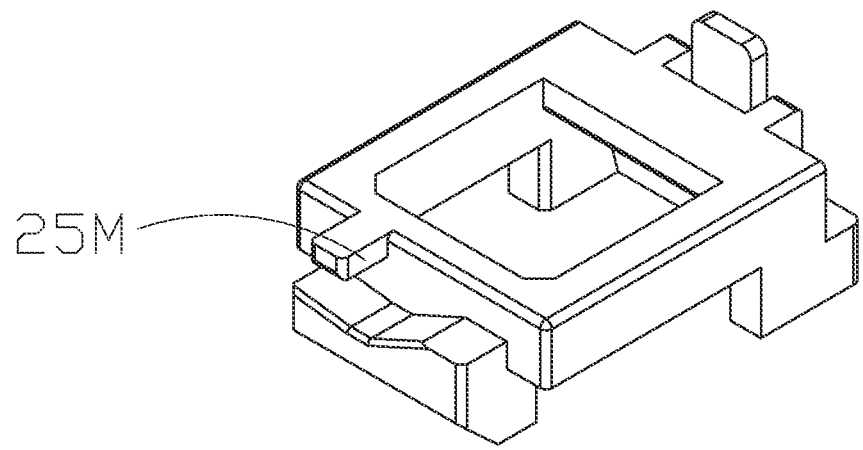
FIG. 22 is a perspective view showing the underside of the left baffle.

In the embodiment, the safety baffle device comprises the left baffle 25, the right baffle 26, and the small baffle 27. The small baffle is located below the right baffle 26, and the left baffle is provided with a set of baffle locking mechanisms. Below the right baffle 26 there is a guide rail 26G. The small baffle 27 has a guiding slit 27A for engaging with the guide rail 26G of the right baffle. Atop the small baffle 27 there is a traveling inclined face 27C, which, under the action of the T-shaped plug, moves the small baffle 27 in a direction perpendicular to the opening direction of the right baffle. On the middle bracket 13 there is provided a slide platform for sliding of the baffle. The small baffle 27 is provided between the right baffle 26 and the slide platform of the middle bracket 13. As shown in FIG. 22, the front end of the left baffle 25 has a lock block 25M. The left side of the small baffle 27 has a lock slit 27B for engaging with the lock block 25M of the left baffle. On the middle bracket 13 there is provided a positioning wedge 13F. Below the small baffle 27 there is a lock face for engaging with the front end of the positioning wedge 13F of the middle bracket and a second guiding slit for engaging with the inclined side surface of the positioning wedge. Upon insertion of the plug, each set of the collaborating wedge mechanisms will be automatically disengaged and unlocked, and upon pullout of the plug, they will be automatically locked. The structure and operation of the baffles may be further understood from U.S. patent application Ser. No. 13/467,018, filed May 8, 2012, published as US 2012/0287572 on Nov. 15, 2012, corresponding to Chinese application 201110122297.5, incorporated herein by reference in their entirety.

The reset button is provided with a left baffle latch corresponding to the left baffles of the two sets of the safety baffle devices. Each left baffle has a positioning leg 25D provided vertically downward. The middle bracket has positioning apertures 13B for insertion of the positioning legs of the left baffles. Each right baffle has an elastic leg 26D. The middle bracket 13 has positioning notches 13E. The positioning notches 13E cooperate with the inner wall of the housing to form the positioning apertures for insertion of the elastic legs 26D of the right baffles. The positioning apertures are formed by the positioning notches of the middle bracket and the lower sidewall within the housing.

The connection point of the positioning leg 25D of each left baffle 25 is located below the left baffle near the outer sidewall, the longitudinal centerline of the positioning leg coincides with that of the outer sidewall of the left baffle. The connection point of the positioning leg 26D of each right baffle is located below the right baffle near the outer side wall and at the outer side corner of the right baffle.

Figure 17:
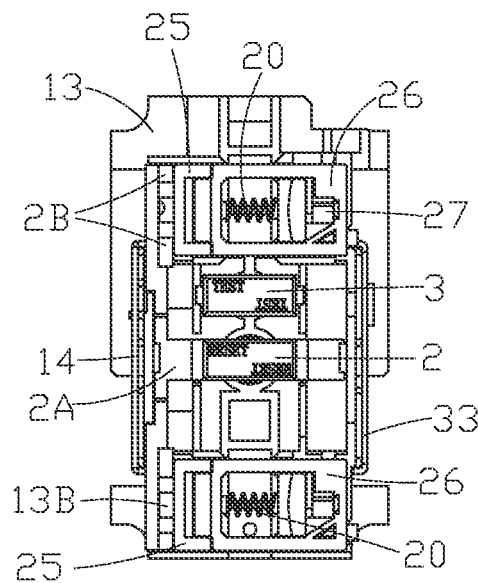
FIG. 17 is a structural top view of embodiment IV in a locked state of the baffles (with the upper cover removed).
Figure 18:
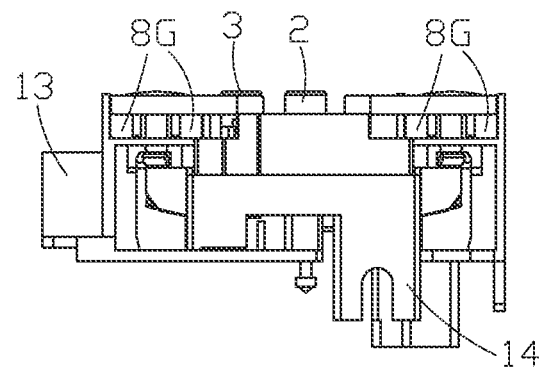
FIG. 18 is a structural side view of embodiment IV in a locked state of the baffles (with the upper cover removed).
Figure 19:
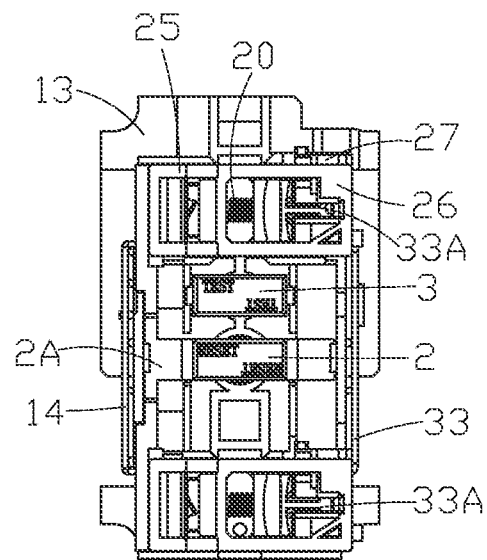
FIG. 19 is a structural top view of embodiment IV in an unlocked state of the baffles (with the upper cover removed).
Figure 20:
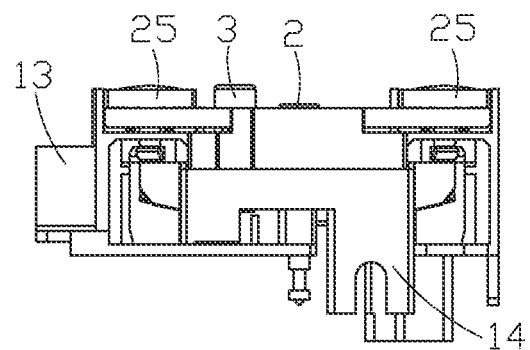
FIG. 20 is a structural side view of embodiment IV in an unlocked state of the baffles (with the upper cover removed).

The operation process is as follows: in the initial state, the reset button 2 is not pressed down, the positioning pin 2B on the baffle latch is in contact with the lock face 25F of the outer side of the left baffle 25, and the left baffle 25 is locked, as shown in FIGS. 17 and 18; when the reset button 2 is pressed down and successfully reset, the baffle latch moves downward with the reset button till the positioning pin 2B is aligned to the unlock slit 25G of the baffle, upon insertion of the plug, the baffle is opened, and the guiding jacks and the conductive jackets are exposed, as shown in FIGS. 19 and 20.

Embodiment IV

Referring to FIGS. 11-20, the embodiment also relates to the power socket with an I-shaped left jack and a T-shaped right jack. In order to further improve the operation stability, based on the embodiment III, this embodiment is further provided as follows: the left baffle latch has two pairs of positioning pins, each of the left baffles on the same side is provided with two unlock slits 25G respectively located on corners of the outer sidewall of the left baffle, and the left baffle latch has a length covering the farthest boundary of the two left baffles on the same side.

Figure 16:
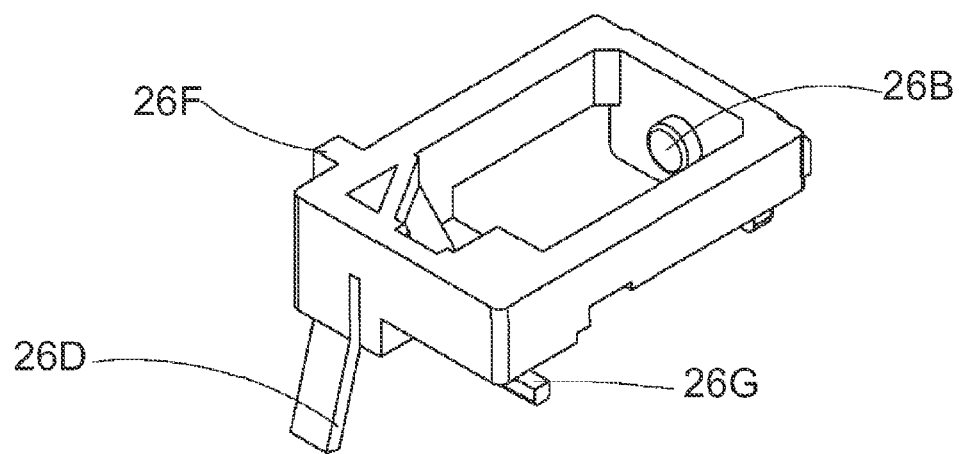
FIG. 16 is a structural view of a left baffle of FIG. 15 with the left baffle turned at an angle.

Opposing outer sides of the two right baffles near the same side of the safety baffle device may be provided with a positioning pin 26F. Or, as shown in FIG. 16, only a single outer side of each right baffle near the safety baffle device may have a single positioning pin. The number and location of positioning steps 2G on the safety baffle device can be adjusted to accommodate the number and position of positioning pins 26F. So, as an example for material savings, the right baffle on a first side of the reset button has a positioning pin 26F on an outer side of the baffle nearest the reset button. The other right baffle on the other side of the reset button likewise has its positioning pin 26F on an outer side of the baffle nearest the reset button. The corresponding extension arms of the safety baffle device then extend to reach the positioning pins 26F with corresponding positioning steps 2G. This configuration uses less material than a safety baffle device with extension arms that extend the entire length of the outer positioning side walls of the baffle devices, and the difference in extension arm lengths can be seen, for example, in FIG. 12.

The reset button 2 is provided with a right baffle latch corresponding to the right baffles 26, and the right baffle latch has a positioning step 2G capable of contacting the positioning pin 26F of the right baffle, the two contact faces of the positioning step 2G are provided stepwise in the opening direction of the baffle serving as the lock and unlock positions respectively. The right baffle latch is shorter than the left baffle latch, which will provide enough space for the movement of the small baffle 27 and the elastic leg of the right baffle, while saving materials and easy to manufacture. FIG. 16 also shows an alternative embodiment where the elastic leg 26D is not centered, but is instead placed to one side of the baffle, preferably a side opposite the guide rail 26G. The connection point of the positioning leg of the left baffle is located below the left baffle near the outer sidewall. The longitudinal centerline of the positioning leg coincides with that of the outer sidewall of the left baffle. The connection point of the positioning leg of the right baffle is located below the right baffle near the outer side wall and at the outer side corner of the right baffle.

The main beneficial effects of the present disclosure are: effectively preventing the movement of the baffle and the lock mechanism upon incorrect wiring; preventing electric shock accident caused by abnormal insertions; safe use; the baffle locking mechanism being integrally formed with the reset button; greatly simplified structure and high reliability of operation; the inner wall of the housing and the baffle latch being provided with collaborating guiding step and guiding slit, which improves the stability of the operation of the baffle latch and effectively prevents incorrect operations.

Figure 4:
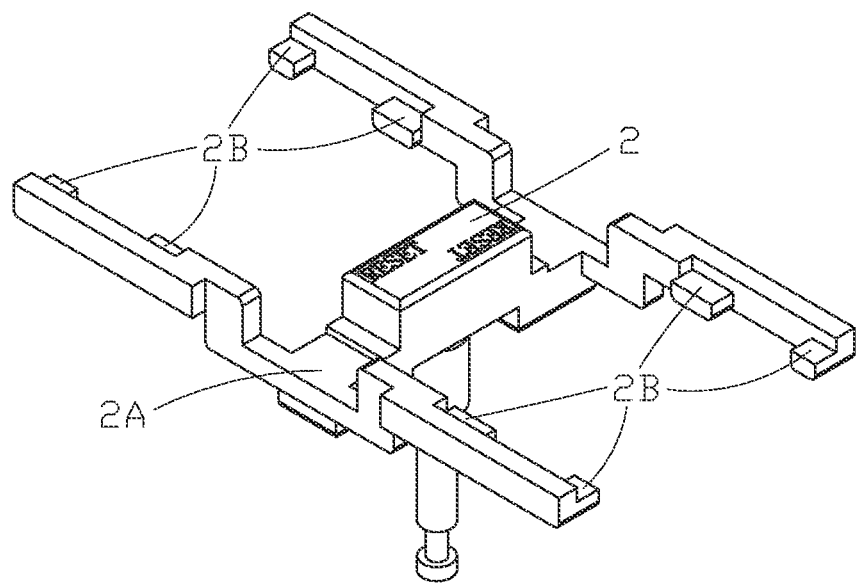
FIG. 4 is a structural view of a reset button with a dual-side baffle latch of embodiment II.

In FIG. 3 and FIG. 4, one baffle latch has four positioning pins 2B, which can lock or unlock the baffle. If there are two positioning pins on a baffle latch, where one positioning pin is on the side of guiding slit 2A and the other positioning pin is on the opposite side, the two positioning pin arrangement can have the same locking and unlocking function as a baffle provided with four positioning pins.

The baffle locking mechanism is integrally formed with the reset button. It is preferable that the integration be the result of a one-piece molding method or other method that effectively fuses the baffle locking mechanism and reset button together as a unitary piece so that the baffle locking mechanism is not a loose piece with respect to the reset button. The positioning step can be integrally formed between a pressable area of the reset button and extending arms of the baffle locking mechanism.

Other implementations will be apparent to those skilled in the art from consideration of the specification and practice of the examples disclosed herein. It is intended that the specification and examples be considered as exemplary only, with a true scope and spirit of the invention being indicated by the following claims.

We claim:
1. A power outlet, comprising:
an enclosure with at least one plug jack;
a reset button comprising at least one integrally formed extension latch arm, the extension latch arm comprising at least one positioning pin; and
at least one baffle configured to selectively block at least a portion of the plug jack, the baffle comprising an outer wall comprising a face, a pin slit, and a leg,
wherein:
the extension latch arm positioning pin is configured to selectively press against the outer wall face when the extension latch arm is in an upward position, the extension latch arm positioning pin is configured to selectively enter the outer wall pin slit when the extension latch arm is in a downward position.

2. The power outlet of claim 1, further comprising a guide step integrally formed with the reset button and the extension latch arm, and an upper cover with a lower frame, the lower frame comprising an inner edge, wherein an outer face of the guide step abuts the inner edge.

3. The power outlet of claim 1, wherein:
the enclosure further comprises at least one socket and a middle bracket configured to support the baffle and the reset button,
the middle bracket further comprises a positioning aperture,
the baffle further comprises a leg on at least one side, and
the leg is configured to slide in the positioning aperture.

4. The power outlet of claim 1, further comprising a second baffle, wherein the at least one baffle and the second baffle are selectively locked from motion and unlocked for motion by the motion of the extension latch arm.

5. The power outlet of claim 1, further comprising:
a second baffle; and
a second extension latch arm integrally formed with the reset button,
wherein:
the extension latch arm abuts the at least one baffle,
the second extension latch arm abuts the second baffle.

6. The power outlet of claim 1, further comprising:
a second baffle stacked with the at least one baffle; and
a small shield beneath the second baffle,
wherein the extension latch arm is provided outside the at least one baffle.

7. A leakage protection outlet comprising:
an upper cover comprising at least one pair of jacks;
a middle bracket;
a power input end;
a power output end;
at least one pair of conductive plug jackets;
a first baffle with an outer face and a positioning slit beneath the outer face;
a second baffle stacked on the first baffle;
a baffle resetting mechanism between the first baffle and the second baffle;
a reset button comprising at least one integrally formed extension latch arm;
a reset mechanism; and
an electromagnetic tripping mechanism;
wherein:
the reset button is linked to the reset mechanism,
the reset mechanism is configured to connect the power input end to the power output end when the reset button is pressed,
the electromagnetic tripping mechanism is configured to disconnect the power input end from the power output end when a leakage current occurs,
the at least one pair of conductive plug jackets correspond to the at least one pair of jacks of the upper cover,
the first baffle and the second baffle are positioned between the at least one pair of conductive plug jackets and the at least one pair of jacks, and
the extension latch arm is movable with the reset button from a first position abutting the outer face of the first baffle to a second position abutting the positioning slit.

8. The leakage protection outlet of claim 7 wherein:
the extension latch arm further comprises a positioning pin,
the positioning pin is configured to push against the outer face when the electromagnetic tripping mechanism has disconnected the power input end and the power output end, and
the positioning pin is configured to enter the positioning slit when the reset button is pressed.

9. The leakage protection outlet of claim 7 wherein:
at least the first baffle comprises a positioning leg
the middle bracket further comprises at least one positioning hole with a first edge opposite a second edge, and
the positioning leg of the first baffle moves from a first position against the first edge to a second position against the second edge as the first baffle moves from a first position covering at least one of the plug jackets to a second position exposing the at least one plug jacket.

10. The leakage protection outlet of claim 7 wherein the middle bracket further comprises at least one guide wall to interact with at least one of the first baffle or the second baffle to ensure that the at least one of the first baffle or the second baffle slides in a fixed direction.

11. The leakage protection outlet of claim 7 wherein:
the at least one guide wall of the middle bracket comprises a vertical panel arranged in parallel with an intended direction of baffle movement, and
the first baffle and the second baffle are provided in a space adjacent the vertical panel.

12. A reset button for an outlet device, comprising:
a pressable middle section;
a post extending away from the pressable middle section, the post have a latching area;
at least one extension latch arm integral with the pressable area; and
at least one positioning pin integral with the extension latch arm, the positioning pin extending perpendicular to the extension latch arm.

13. The reset button of claim 12, further comprising an integral positioning step between the at least one positioning pin and the pressable area.

14. A leakage protection socket with an integrated baffle locking mechanism, comprising:
a housing with two sets of guiding jacks and two sets of power jackets;
a reset button comprising a post with a locking area and a reset spring surrounding a portion of the post, the reset button being integrally formed with at least one baffle latch, each at least one baffle latch comprising a first positioning pin and a second positioning pin;
a lock mechanism configured to lock the rest button locking area when the reset button moves from a first position to a second position;
an electromagnetic trip mechanism configured to unlock the reset button locking area when a leaking current triggers the electromagnetic trip mechanism; and
two sets of safety baffle devices between the guiding jacks and the power jackets, each set of safety baffle devices including a reset mechanism, a first baffle, and a second baffle configured to move between a first position that prevents access from the guiding jacks to the power jackets and a second position that exposes the power jackets for access from the guiding jacks,
wherein at least each of the first baffles comprise an outer face and a positioning slit below the outer face,
wherein, when the reset button moves from the first position to the second position, the positioning pins move from positions against the outer faces to positions in the positioning slits and the safety baffle devices are unlocked for motion, wherein, when the reset button locking area is unlocked, the reset spring moves the positioning pins from the positioning slits to the positions against the outer faces and the safety baffle devices are locked from motion.

15. The leakage protection socket of claim 14, wherein:
the first positioning pin of the at least one baffle latch corresponds to the first baffle of a first of the two sets of safety baffle devices and the second positioning pin of the at least one baffle latch corresponds to the first baffle of a second of the two sets of safety baffle devices,
the reset button comprises a second baffle latch with plural positioning pins configured to lock and unlock respective second baffles, and
each second baffle comprises a respective outer face and a respective positioning slit for cooperating with one of the respective plural positioning pins.

16. The leakage protection socket of claim 14, wherein:
the reset button is between a first of the set of two safety baffle devices and a second of the set of two safety devices,
each safety baffle device is rectilinear and has two opposed boundaries furthest from the reset button, and
the at least one baffle latch has a length extending from a furthest boundary of the first of the set of two safety devices to a furthest boundary of the second of the set of two safety devices.

17. The leakage protection socket of claim 14, wherein:
the housing further comprises an upper cover,
the upper cover further comprises a mounting aperture to expose the reset button,
the baffle latch further comprises a guiding slit with a side wall and an opening facing upward,
the upper cover further comprises a guiding step which extends into the guiding slit of the baffle latch, and the guiding step maintains contact with the side wall of the guiding slit when the baffle latch moves with the reset button between the first position and the second position.

18. The leakage protection socket of claim 14, wherein:
each of the second baffles comprise a respective outer face above respective two positioning slits,
the positioning slits of the first baffles and the positioning slits of the second baffles are located on corners and each of the positioning slits comprise three open sides,
the reset button is integrally formed with at least two baffle latches, each baffle latch comprises the first positioning pin, the second positioning pin, a third positioning pin, and a fourth positioning pin,
the first positioning pin and the third positioning pin of the first baffle latch are configured to move between the outer face and the two positioning slits of the first baffle of a first of the set of safety baffle devices,
the second positioning pin and the fourth positioning pin of the first baffle latch are configured to move between the outer face and the two positioning slits of the first baffle of a second of the set of safety baffle devices,
the first positioning pin and the third positioning pin of the second baffle latch are configured to move between the outer face and the two positioning slits of the second baffle of the first of the set of safety baffle devices, and
the second positioning pin and the fourth positioning pin of the second baffle latch are configured to move between the outer face and the two positioning slits of the second baffle of the second of the set of safety baffle devices.

19. The leakage protection socket of claim 14, wherein:
the first baffles are slidably engaged in a crossing way with the second baffles,
the housing further comprises a middle bracket with guiding jacks,
the middle bracket comprises a slide platform for the two sets of safety baffle devices to slide on, and
the two sets of safety baffle devices are movable to close access to the guiding jacks.

20. The leakage protection socket of claim 19, wherein:
the reset mechanism comprises a spring between the first baffle and the second baffle,
each of the first baffles and each of the second baffles further comprise a respective baffle leg,
the middle bracket further comprises at least four positioning apertures, each positioning aperture comprising a first edge and a second edge,
a respective one of each of the baffle legs is positioned in a respective one of the positioning apertures, and
each of the baffle legs is movable from a first position abutting the respective first edge to a second position abutting the respective second edge.

21. The leakage protection socket of claim 19, wherein:
wherein the reset mechanism comprises an elastic leg on at least each first baffle,
the middle bracket further comprises at least two positioning apertures, each positioning aperture comprising a first edge and a second edge,
a respective one of each of the elastic legs is positioned in a respective one of the positioning apertures, and
each of the elastic legs is movable from a first position abutting the respective first edge to a second position abutting the respective second edge.

22. The leakage protection socket of claim 19, wherein:
the reset mechanism comprises an elastic leg on each of the first baffles and on each of the second baffles,
the middle bracket further comprises at least four positioning apertures, each positioning aperture comprising a first edge and a second edge,
a respective one of each of the elastic legs is positioned in a respective one of the positioning apertures, and
each of the elastic legs is movable from a first position abutting the respective first edge to a second position abutting the respective second edge.

23. The leakage protection socket of claim 22, wherein each of the elastic legs is located at an edge of an outer side wall of its respective baffle, and each elastic leg comprises a groove at the edge for elastic movement of the elastic leg.

24. The leakage protection socket of claim 14, wherein:
the housing further comprises a middle bracket comprising guide jacks and positioning wedges, and
each of the two sets of safety shield devices further comprises a respective:
small baffle;
first guide groove;
second guide groove;
guide rail;
locking block;
locking groove;
positioning wedge;
latching face; and
travel slant,
further wherein:
a first guide jack of the middle bracket is T-shaped,
a second guide jack of the middle bracket is I-shaped,
each first baffle overlaps in a sliding way with its respective second baffle,
the guide rail is provided below the second baffle,
the small baffle includes the first guide groove to match with the guide rail of the second baffle, above the small baffle, the travel slant is configured to back the small baffle off along a direction perpendicular to a second baffle opening direction when the second baffle is under the action of a T-shaped plug, the locking block is provided at the front end of the right baffle, the locking groove is provided in a side of the small baffle to match with the locking block of the first baffle, below the small baffle, the latching face is provided to match with the front end of the positioning wedge of the middle bracket, and the second guide groove is provided to match with a slant side of the positioning wedge.

25. The leakage protection socket of claim 24, wherein:

the middle bracket further comprises positioning apertures and positioning notches, the positioning notches abut a side wall of the housing, each of the first baffles comprises a positioning leg projecting in to the positioning aperture, and each of the second baffles comprises an elastic leg projecting in to the positioning notches and against the side wall of the housing.

26. The leakage protection socket of claim 25, wherein:

each first baffle further comprises an outer sidewall perpendicular to the outer face, the outer sidewall having a longitudinal centerline, the connection point of the positioning leg of the first baffle is located at a bottom edge of the left baffle near the outer sidewall, each positioning leg comprises a longitudinal centerline which coincides with the longitudinal centerline of the outer sidewall of the first baffle, when the first baffle and the second baffle are stacked, the connection point of the positioning leg of the first baffle is located below the second baffle near an outer side wall of the second baffle and at an outer side corner of the second baffle.

27. The leakage protection socket of claim 14, wherein:

each of the second baffles comprises an outer wall with a perpendicular positioning peg, each of the positioning pegs comprises a first peg face and a second peg face, the reset button comprises a second baffle latch further comprising two stepped positioning pins, each of the positioning pins comprises a first contact face and a second contact face, when the reset button is in the first position, the first peg faces abut the first contact faces and the second baffles are locked from motion, and when the reset button is in the second position, the second peg faces are in sliding contact with the second contact faces and the second baffles are unlocked for motion.

* * * * *